(12) United States Patent
Ito (10) Patent No.: US 10,164,347 B2
(45) Date of Patent: Dec. 25, 2018

(54) ANTENNA DEVICE AND ELECTRONIC APPLIANCE

(71) Applicant: Murata Manufacturing Co., Ltd., Nagaokakyo-shi, Kyoto-fu (JP)

(72) Inventor: Hiromitsu Ito, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 142 days.

(21) Appl. No.: 14/803,262

(22) Filed: Jul. 20, 2015

(65) Prior Publication Data

US 2015/0325927 A1 Nov. 12, 2015

Related U.S. Application Data

(63) Continuation of application No. PCT/JP2014/083830, filed on Dec. 22, 2014.

(30) Foreign Application Priority Data

Dec. 26, 2013 (JP) ................................. 2013-269923
Jul. 9, 2014 (JP) ................................. 2014-140995

(51) Int. Cl.
*H01Q 21/29* (2006.01)
*H01Q 1/50* (2006.01)
(Continued)

(52) U.S. Cl.
CPC ............. *H01Q 21/29* (2013.01); *H01Q 1/24* (2013.01); *H01Q 1/243* (2013.01); *H01Q 1/50* (2013.01);
(Continued)

(58) Field of Classification Search
CPC ........ H01Q 21/29; H01Q 1/243; H01Q 21/06; H01Q 21/24; H01Q 21/28; H01Q 1/521;
(Continued)

(56) References Cited

U.S. PATENT DOCUMENTS 6,362,793 B1 * 3/2002 Sawamura ............. H01Q 1/243
343/702
2003/0090429 A1 * 5/2003 Masudaya ............ H01Q 1/3241
343/788
(Continued)

FOREIGN PATENT DOCUMENTS

EP         2 573 871 A1   3/2013
JP         2011-127368 A  6/2011
(Continued)

OTHER PUBLICATIONS

Yamamoto et al. JP 2011127368 A Machine Translation.*
(Continued)

*Primary Examiner* — Jessica Han
*Assistant Examiner* — Michael Bouizza
(74) *Attorney, Agent, or Firm* — Keating & Bennett, LLP (57) ABSTRACT

An antenna device includes a plurality of coil antennas each including a coil conductor wound around a winding axis and a planar conductor including a first edge and a second edge between which a corner or a curved portion is interposed. A first coil antenna is arranged at a position along the first edge of the planar conductor at which one coil opening thereof is superposed with the planar conductor when viewed in plan and that is close to the corner or close to the curved portion. A second coil antenna is arranged at a position along the second edge of the planar conductor at which one coil opening thereof is superposed with the planar conductor when viewed in plan. The first coil antenna and the second coil antenna are connected such that magnetic flux generated by the first coil antenna and magnetic flux generated by the second coil antenna are in phase with each other in a direction toward the outside with the first edge and the second edge of the planar conductor defining boundaries.

17 Claims, 12 Drawing Sheets

(51) Int. Cl.
  *H01Q 1/24* (2006.01)
  *H01Q 7/06* (2006.01)
  *H01Q 21/00* (2006.01)
  *H01Q 7/00* (2006.01)
  *H01Q 1/52* (2006.01)
  *H01Q 21/06* (2006.01)
  *H01Q 21/24* (2006.01)
  *H01Q 21/28* (2006.01)
  *H04M 1/02* (2006.01)

(52) U.S. Cl.
  CPC .............. *H01Q 1/521* (2013.01); *H01Q 7/00* (2013.01); *H01Q 7/06* (2013.01); *H01Q 21/0006* (2013.01); *H01Q 21/06* (2013.01); *H01Q 21/24* (2013.01); *H01Q 21/28* (2013.01); *H04M 1/026* (2013.01); *H04M 2250/04* (2013.01)

(58) Field of Classification Search
  CPC ........ H01Q 21/0006; H01Q 1/24; H01Q 7/06; H01Q 1/50; H01Q 7/00; H04M 2250/04; H04M 1/026
  See application file for complete search history.

(56) References Cited

U.S. PATENT DOCUMENTS

2013/0249753 A1* 9/2013 Asanuma ................ H01Q 9/42
                                                            343/749
2014/0176384 A1   6/2014 Yosui et al.

FOREIGN PATENT DOCUMENTS

| JP | 2011-147104 A | 7/2011 |
| WO | 2011/055702 A1 | 5/2011 |
| WO | 2012/033031 A1 | 3/2012 |
| WO | 2013/183552 A1 | 12/2013 |

OTHER PUBLICATIONS

Official Communication issued in International Patent Application No. PCT/JP2014/083830, dated Mar. 10, 2015.
Official Communication issued in Japanese Patent Application No. 2015-520453, dated Jun. 9, 2015.
Official Communication issued in United Kingdom Patent Application No. 1510754.3, dated Sep. 29, 2017.

* cited by examiner

ANTENNA DEVICE AND ELECTRONIC APPLIANCE

BACKGROUND OF THE INVENTION

1. Field of the Invention

The present invention relates to antenna devices preferably for use in HF band communication systems, for example, and to electronic appliances.

2. Description of the Related Art

It is known that by arranging a coil antenna on a planar conductor, the planar conductor comes to have a function of collecting magnetic flux generated by a communication partner on the coil antenna and a function of radiating magnetic flux generated by the coil antenna. Furthermore, it has been disclosed that by arranging a plurality of coil antennas on a planar conductor, magnetic flux is efficiently guided to the coil antennas.

In a system that uses a HF band as communication frequencies, coil antennas are used in antenna devices and communication is performed in a state where the coil antennas are magnetically coupled with each other. Consequently, it is important to increase the coupling coefficient of the coil antennas in order to increase the communication performance.

However, there are cases where it is not possible to increase the coupling between a coil antenna and a communication antenna by simply arranging a plurality of coil antennas on a planar conductor as described in International Publication No. 2012/033031.

SUMMARY OF THE INVENTION

Preferred embodiments of the present invention provide an antenna device that increases a coupling coefficient with a coil antenna of a certain communication-partner-side antenna device and also provide a small-sized electronic appliance.

An antenna device according to a preferred embodiment of the present invention includes a plurality of coil antennas each including a coil conductor wound around a winding axis; and a planar conductor including a first edge and a second edge between which a corner or a curved portion is interposed. A first coil antenna among the plurality of coil antennas is arranged at a position along the first edge of the planar conductor at which one coil opening thereof is superposed with the planar conductor when viewed in plan and that is close to the corner or close to the curved portion. A second coil antenna among the plurality of coil antennas is arranged at a position along the second edge of the planar conductor at which one coil opening thereof is superposed with the planar conductor when viewed in plan. The first coil antenna and the second coil antenna are connected such that magnetic flux generated by the first coil antenna and magnetic flux generated by the second coil antenna are in phase with each other in an outward direction with the first edge and the second edge of the planar conductor acting as boundaries.

With this configuration, the coupling coefficient with a coil antenna of a communication-partner-side antenna device is increased and antenna characteristics are improved.

It is preferable that the second coil antenna be located at a position close to the corner or close to the curved portion. As a result, the coupling coefficient with a coil antenna of a communication-partner-side antenna device is further increased and antenna characteristics are improved.

It is preferable that the winding axis of the first coil antenna and the winding axis of the second coil antenna cross each other or have a twisted positional relationship. Consequently, a range of positions at which coupling with a communication-partner-side antenna device occurs is widened and the range over which communication is able to be performed is increased.

An electronic appliance according to another preferred embodiment of the present invention includes the antenna device according to any one of the preferred embodiments of the present invention described above and a communication circuit that is connected to the plurality of coil antennas.

According to various preferred embodiments of the present invention, an antenna device includes a coil antenna that couples with a coil antenna of a communication-partner-side antenna device with a high coupling coefficient while being small, and an electronic appliance has a high communication performance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereafter, preferred embodiments of the present invention will be described by giving a number of specific examples while referring to the drawings. Like symbols denote like elements or portions in the drawings. Each preferred embodiment is an illustrative example, and elements or portions of the configurations illustrated in different preferred embodiments can be substituted or combined with each other.

Antenna devices and electronic appliances of each of the following preferred embodiments are preferably used in a HF band RFID system such as near field communication (NFC), for example.

First Preferred Embodiment

Figure 1:
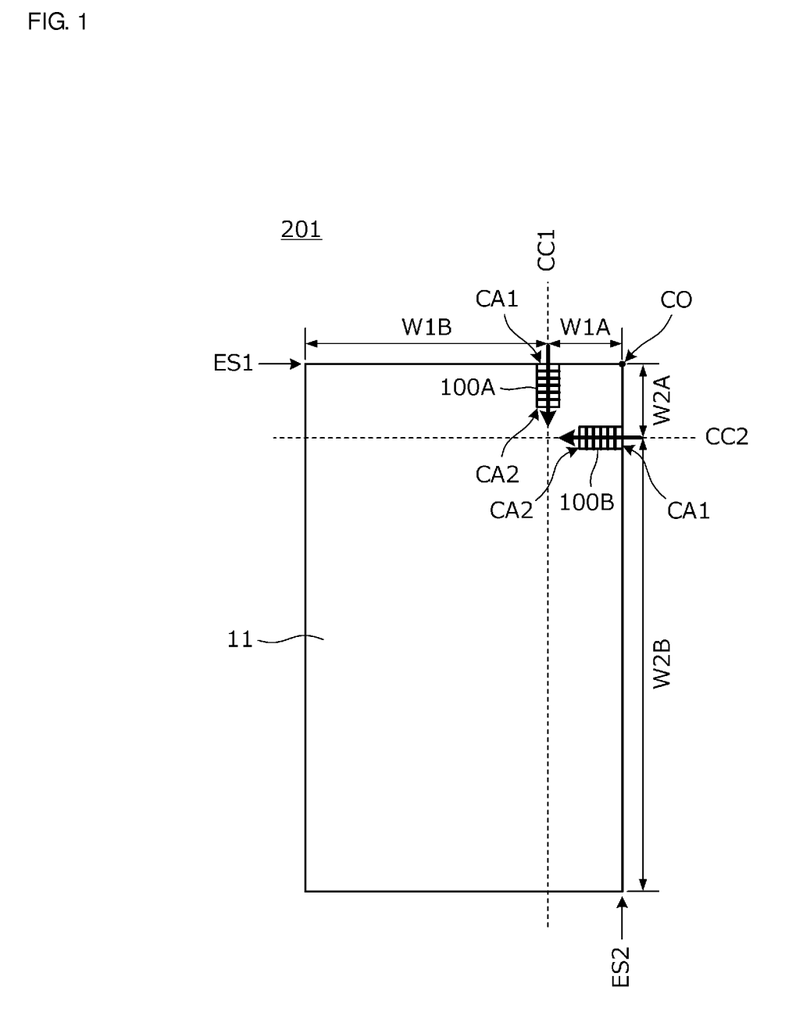
FIG. 1 is a plan view of an antenna device 201 according to a first preferred embodiment of the present invention.

FIG. 1 is a plan view of an antenna device 201 according to a first preferred embodiment of the present invention.

The antenna device 201, as illustrated in FIG. 1, includes a first coil antenna 100A, a second coil antenna 100B and a planar conductor 11. The first coil antenna 100A includes a coil conductor that is wound around a winding axis CC1 and the second coil antenna 100B includes a coil conductor that is wound around a winding axis CC2. The planar conductor 11 preferably has a rectangular or substantially rectangular shape and includes a first edge ES1 and a second edge ES2 between which a corner CO is interposed.

As used herein "planar conductor" indicates not only a conductor that is completely planar or flat, but also a conductor that is substantially planar or mostly flat (i.e., within manufacturing tolerances or including slight variations in flatness) as would have been understood by persons of skill in the art.

The coil antennas 100A and 100B each include a first coil opening end CA1 and a second coil opening end CA2. The first coil antenna 100A is arranged at a position along the first edge ES1 of the planar conductor 11 at which the second coil opening end CA2 thereof is superposed with the planar conductor 11 when viewed in plan and that is closer to the corner CO than the center of the first edge ES1. The second coil antenna 100B is arranged at a position along the second edge ES2 of the planar conductor 11 at which the second coil opening end CA2 thereof is superposed with the planar conductor 11 when viewed in plan and that is closer to the corner CO than the center of the second edge ES2.

Here, the relation W1A<W1B holds true, where W1A and W1B represent the distances from the two ends of the first edge ES1 to the first coil antenna 100A. In addition, the relation W2A<W2B holds true, where W2A and W2B represent the distances from the two ends of the second edge ES2 to the second coil antenna 100B.

In FIG. 1, the directions of arrows that extend along the coil winding axes CC1 and CC2 illustrate the directions of magnetic flux at a certain timing (phase angle). Thus, the first coil antenna 100A and the second coil antenna 100B are connected in parallel or series with each other such that magnetic flux generated by the first coil antenna 100A and magnetic flux generated by the second coil antenna 100B are in phase with each other in a direction toward the outside with the first edge ES1 and the second edge ES2 of the planar conductor 11 defining and functioning as boundaries.

The winding axis CC1 of the first coil antenna 100A and the winding axis CC2 of the second coil antenna 100B cross each other. In this preferred embodiment, the winding axes cross each other perpendicularly or substantially perpendicularly, for example.

The planar conductor 11 preferably includes a metal foil such as one composed of Cu, Ag or Al and is provided on a rigid resin substrate such as one composed of epoxy resin.

Figure 2:
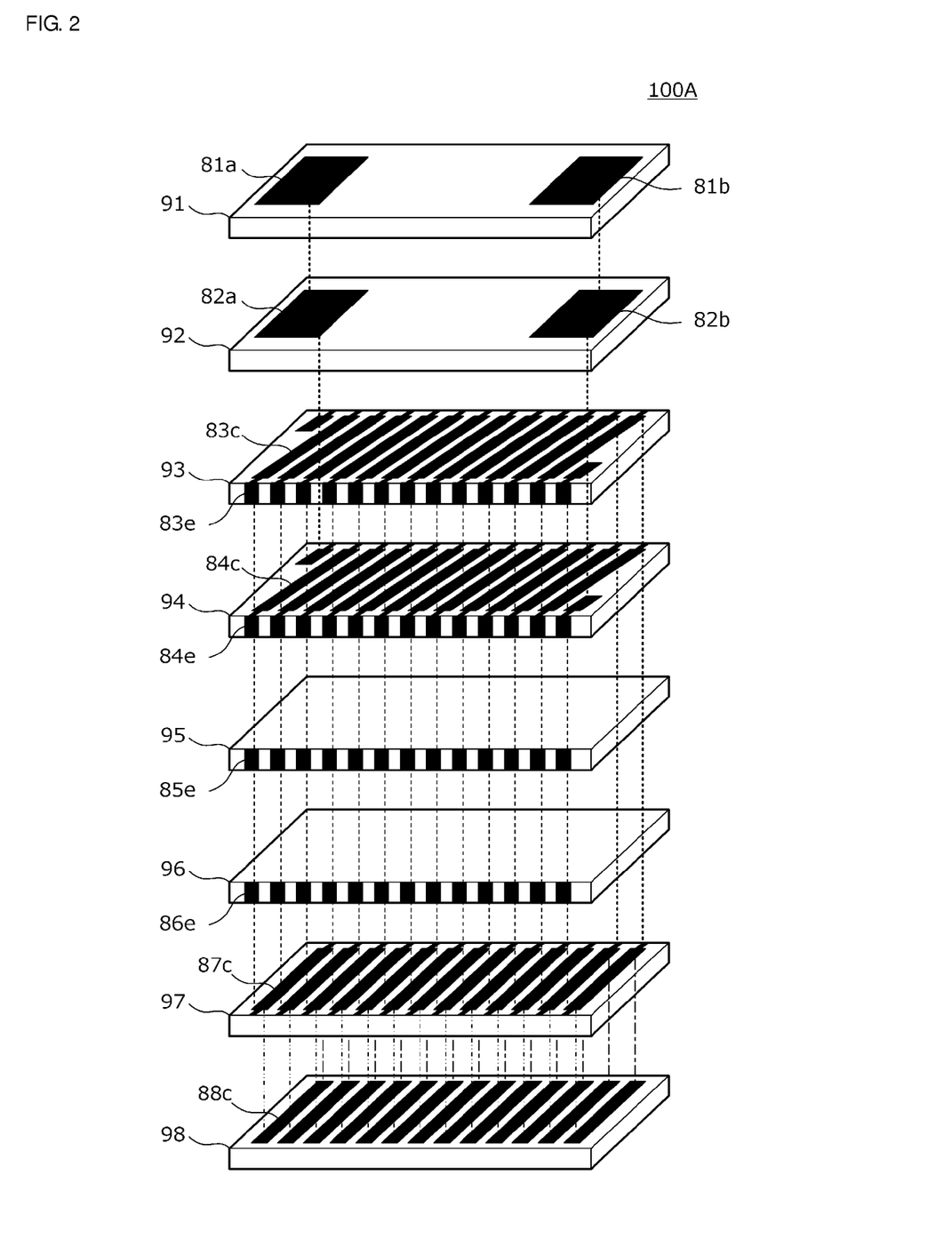
FIG. 2 is an exploded perspective view of a coil antenna 100A.

FIG. 2 is an exploded perspective view of the coil antenna 100A. The coil antenna 100B is preferably the same as the coil antenna 100A and therefore the coil antenna 100A will be described here. The coil antenna 100A preferably includes a multilayer body including substrate layers 91 to 98. The substrate layers 91, 92, 93, 97 and 98 are non-magnetic layers such as non-magnetic ferrite layers and the substrate layers 94, 95 and 96 are magnetic layers such as magnetic ferrite layers.

Terminal electrodes 81a, 81b, 82a and 82b are provided on the substrate layers 91 and 92. The terminal electrodes 81a and 82a are connected to each other through a via electrode (interlayer connection conductor) and the terminal electrodes 81b and 82b are connected to each other through a via electrode. Line-shaped electrodes (in-plane coil conductors) 83c are provided on one surface of the substrate layer 93 and line-shaped electrodes 84c are provided on one surface of the substrate layer 94. Side-surface electrodes (side surface coil conductors) 83e and 84e are provided on both side surfaces of the substrate layers 93 and 94. The line-shaped electrodes 83c and 84c are connected in parallel with each other through via electrodes. The two end portions of the line-shaped electrodes 83c and 84c on the outer side are connected to the terminal electrodes 82a and 82b through via electrodes. Side-surface electrodes 85e and 86e are provided on the two side surfaces of the substrate layers 95 and 96. Line-shaped electrodes 87c are provided on one surface of the substrate layer 97 and line-shaped electrodes 88c are provided on one surface of the substrate layer 98. The line-shaped electrode 87c and 88c are connected in parallel with each other through via electrodes.

The line-shaped electrodes 83c and 84c are connected in parallel with each other and the line-shaped electrodes 87c and 88c are connected in parallel with each other and as a result the direct-current resistance component of the coil is reduced. In addition, the line-shaped electrodes 83c, 84c, 87c and 88c extend over an outer periphery of magnetic layers and the side-surface electrodes 83e, 84e, 85e and 86e extend over side surfaces of the multilayer body and consequently the coil opening is made large and confinement of magnetic flux is reduced.

Figure 3A:
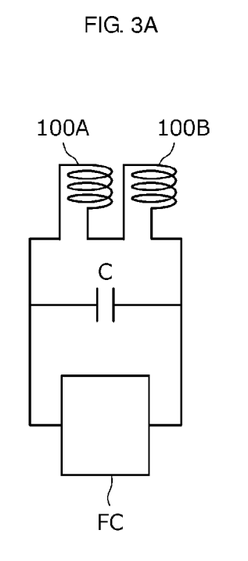
FIGS. 3A and 3B are circuit diagrams illustrating examples of ways of connecting two coil antennas.
Figure 3B:
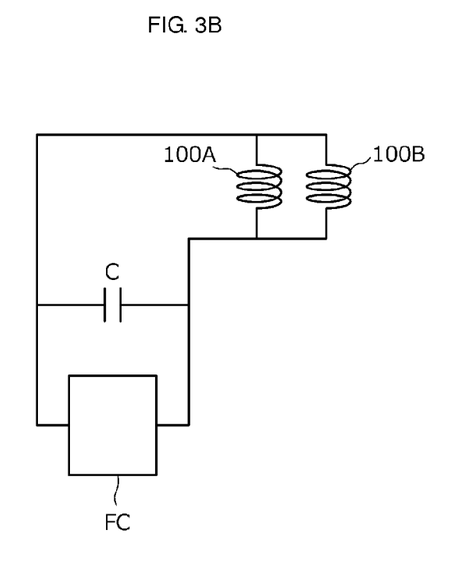

FIGS. 3A and 3B are circuit diagrams illustrating examples of ways of connecting the two coil antennas. The two coil antennas 100A and 100B are connected in series in FIG. 3A and are connected in parallel in FIG. 3B. A feeder circuit FC is an RFIC, for example. A reactance element such as a capacitor C to provide impedance matching and resonant frequency setting of the coil antennas 100A and 100B is preferably included as necessary in the feeder circuit.

When coil conductors of a plurality of coil antennas are connected in series with a feeder circuit, inductance values of the coil antennas are increased. Furthermore, when coil conductors of a plurality of coil antennas are connected in parallel with a feeder circuit, loss is reduced (Q value is improved).

Figure 4A:
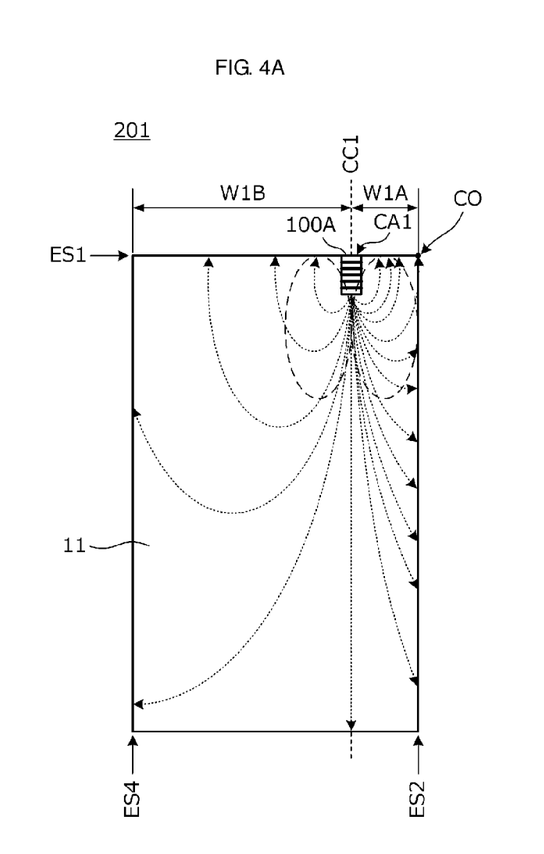
FIGS. 4A and 4B illustrate the relationship between a coupling coefficient with a communication-partner-side antenna device and a planar position of a coil antenna with respect to a planar conductor 11.
Figure 4B:
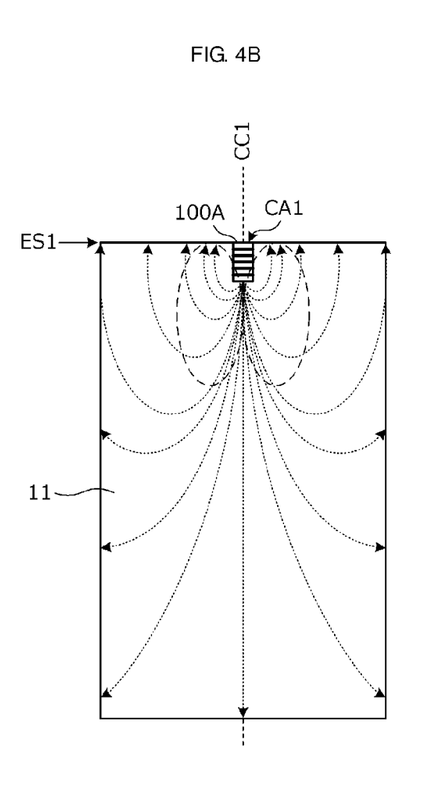

FIGS. 4A and 4B illustrate an effect due to the position of the coil antenna 100A with respect to an edge of the planar conductor 11 and the planar conductor 11.

Regarding magnetic flux moving toward the planar conductor 11 out of magnetic flux exiting the coil openings of the coil antenna 100A, the magnetic flux is distributed across the planar conductor 11 due to a magnetic field component perpendicular or substantially perpendicular to the planar conductor 11 being canceled by magnetic flux generated by an induction current generated in the planar conductor 11. The arrows in FIGS. 4A and 4B illustrate the distribution of the magnetic flux.

As a result of the coil antenna 100A being contiguous with the edge ES1 of the planar conductor 11, the coil antenna 100A is coupled with a current path that encloses an edge portion of the planar conductor 11 through which an induction current readily flows and the planar conductor 11 acts as a radiating element (booster). In this way, the antenna characteristics (radiation effect of radiating magnetic flux to the communication-partner-side antenna device and magnetism collection effect of collecting magnetic flux from the communication-partner-side antenna device) are improved.

As illustrated in FIG. 4B, when the coil antenna 100A is arranged in the center of the first edge ES1 of the planar conductor 11, the distribution of magnetic flux over the planar conductor 11 from the coil antenna 100A is symmetrical about the winding axis CC1.

In contrast, as illustrated in FIG. 4A, when the coil antenna 100A is arranged close to the corner CO of the planar conductor 11, the distribution of magnetic flux generated by the coil antenna 100A over the planar conductor 11 is asymmetrical about the winding axis CC1. More specifically, the magnetic flux density is higher in a region from the winding axis CC1 of the coil antenna 100A toward the corner CO than in a region from the winding axis CC1 toward the center of the edge ES1.

This can be explained in the following way. When the coil antenna 100A is arranged close to the corner CO of the planar conductor 11, the distance from the side of the coil antenna 100A on the side opposite to the corner CO to an edge ES4 of the planar conductor 11 is large. In addition, the amount of magnetic flux canceled by an induction current generated in the planar conductor 11 is large. Therefore, the magnetic flux density in a region on the side of coil antenna 100A on the opposite side to the corner CO and extending along the edge ES4 of the planar conductor 11 is small. On the other hand, regarding magnetic flux on the corner CO side out of magnetic flux exiting the coil opening end CA1 of the coil antenna 100A, the amount of magnetic flux canceled by an induction current generated in the planar conductor 11 is small since the planar conductor 11 does not exist beyond the edges ES1 and ES2 of the planar conductor 11. In FIG. 4A, there are different numbers of lines of magnetic force passing through regions illustrated with elliptical broken lines. Therefore, the magnetic flux density is high in a region along the edges ES1 and ES2.

Thus, by arranging the coil antenna 100A at a position closer to the corner CO than the center of the first edge ES1, as described above, the magnetic flux density in the vicinity of the corner CO is increased.

Figure 5:
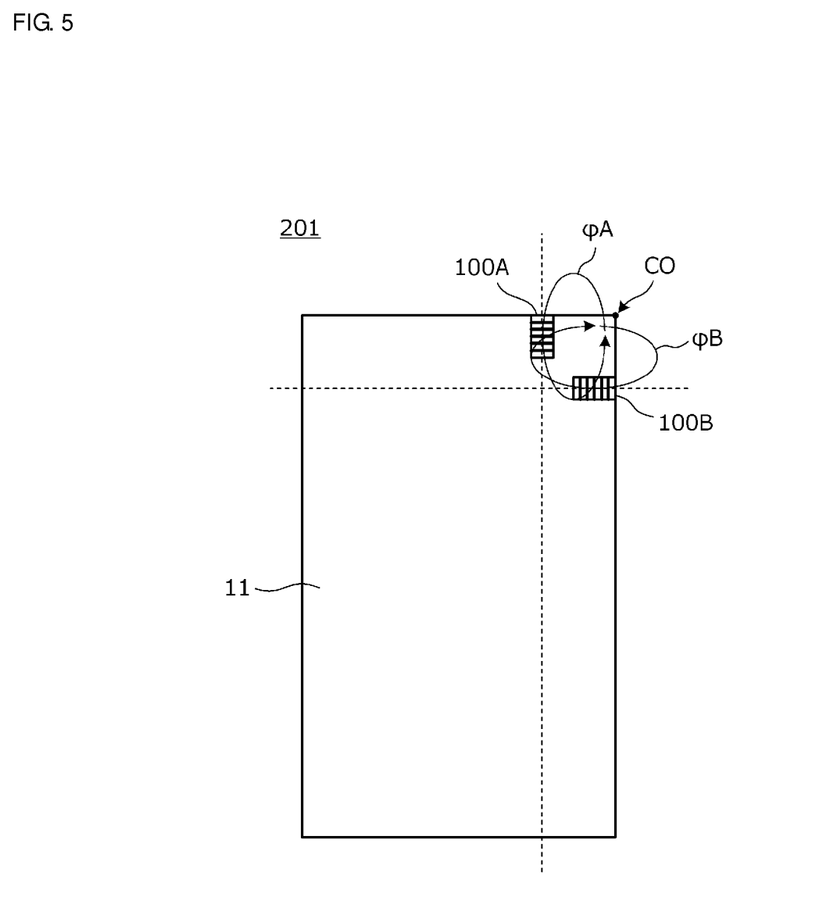
FIG. 5 illustrates an effect due to the position of a coil antenna 100A with respect to an edge of a planar conductor 11 and the planar conductor 11.

FIG. 5 illustrates a coupling coefficient improvement effect due to the two coil antennas 100A and 100B being close to the corner CO of the planar conductor 11.

Here, a coupling coefficient k is given by the relationship of the following expression, where L1 represents the inductance of the antenna device 201 due to the coil antennas 100A and 100B and the planar conductor 11, L2 represents the inductance of the communication-partner-side antenna device and M represents the mutual inductance of the antenna device 201 and the communication-partner-side antenna device.

$$k = M/\sqrt{(L1 \cdot L2)}$$

In other words, the coupling coefficient k is the proportion of magnetic flux contributing to coupling with the communication-partner-side antenna device out of magnetic flux generated by the antenna device 201.

Magnetic flux along the planar conductor 11 generated by the first coil antenna 100A illustrated in FIG. 4A is magnetic flux originally directed toward the planar conductor 11 and therefore includes a lot of magnetic flux that does not contribute to coupling with the communication-partner-side antenna device. Specifically, the magnetic flux is magnetic flux generating small loops parallel to the planar conductor 11 and magnetic flux (described below) generating loops around to the opposite side of the planar conductor 11 to the coil antenna 100A.

Here, a case is considered in which the two coil antennas 100A and 100B are arranged with the corner CO interposed therebetween and are driven with the same phase. Magnetic flux φA along the planar conductor 11 generated by one coil antenna (first coil antenna 100A) is linked with the other coil antenna (second coil antenna 100B). Similarly, magnetic flux φB along the planar conductor generated by the other coil antenna (second coil antenna 100B) is linked with the one coil antenna (first coil antenna 100A). At this time, since the linked magnetic fluxes have a reverse directional relationship with each other, they cancel each other out (weaken each other) and composite magnetic flux generated by the two coil antennas 100A and 100B does not appear. Therefore, among magnetic flux generated by the two coil antennas 100A and 100B, magnetic flux that does not contribute to coupling with the communication-partner-side antenna device is reduced and the proportion of magnetic flux that contributes to coupling with the communication-partner-side antenna device is increased and therefore the coupling coefficient is increased. Then, since the coil antennas 100A and 100B are arranged close to the corner CO, magnetic flux that does not contribute to coupling with the communication-partner-side antenna device is efficiently reduced, the coupling coefficient between the antenna device 201 and the communication-partner-side antenna device is increased and the antenna characteristics are improved.

Figure 6A:
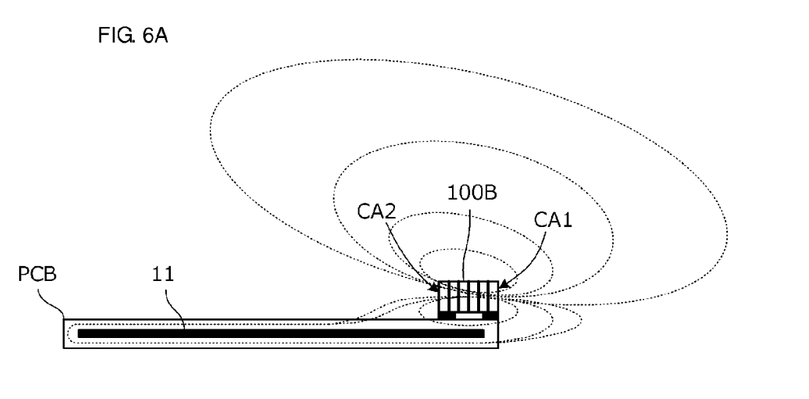
FIGS. 6A and 6B illustrate a coupling coefficient improvement effect due to two coil antennas 100A and 100B being close to a corner CO of a planar conductor 11.
Figure 6B:
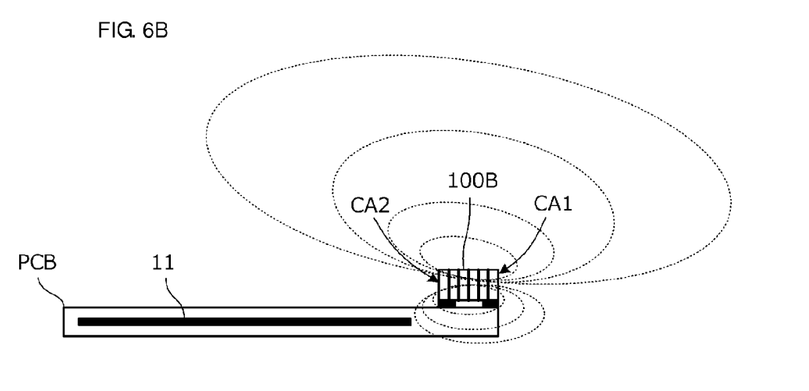

FIGS. 6A and 6B illustrate the relationship between the coupling coefficient with the communication-partner-side antenna device and the planar position of a coil antenna with respect to the planar conductor 11.

As illustrated in FIG. 6B, when both the first coil opening end CA1 and the second coil opening end CA2 of the coil antenna 100B are located outside the planar conductor 11 when viewed in plan, almost all the magnetic flux radiated from the second coil opening end CA2 of the coil antenna 100B toward the planar conductor 11 (magnetic flux directed below coil antenna 100B in orientation of FIGS. 6A and 6B) is magnetic flux that does not extend along the planar conductor 11. Since the majority of this magnetic flux is not directed toward the communication-partner-side antenna device, it does not contribute to communication. Consequently, a high coupling coefficient is not obtained even if a plurality of coil antennas are provided.

In contrast, as illustrated in FIG. 6A, when the second coil opening end CA2 of the coil antenna 100B is located over the planar conductor 11, the majority of magnetic flux generated by one coil antenna (coil antenna 100B) and directed below the coil antenna links with the other coil antenna (coil antenna 100A) along the top of the planar conductor 11. In other words, magnetic flux that does not contribute to communication is collected by the other coil antenna via the planar conductor and therefore the coupling coefficient with the communication-partner-side antenna device is accordingly increased.

Figure 7A:
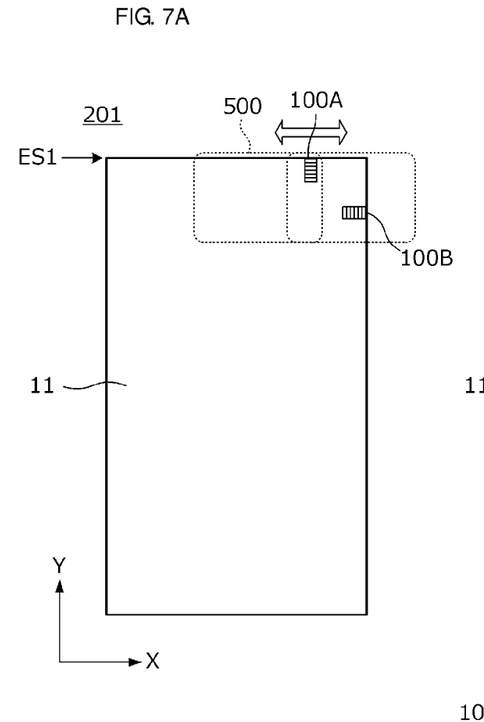
FIGS. 7A, 7B and 7C illustrate an effect caused by the winding axes of two coil antennas 100A and 100B crossing each other.
Figure 7B:
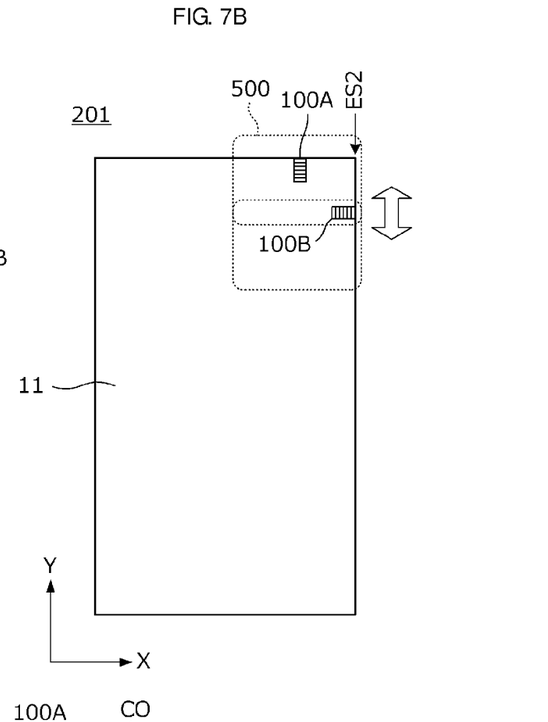
Figure 7C:
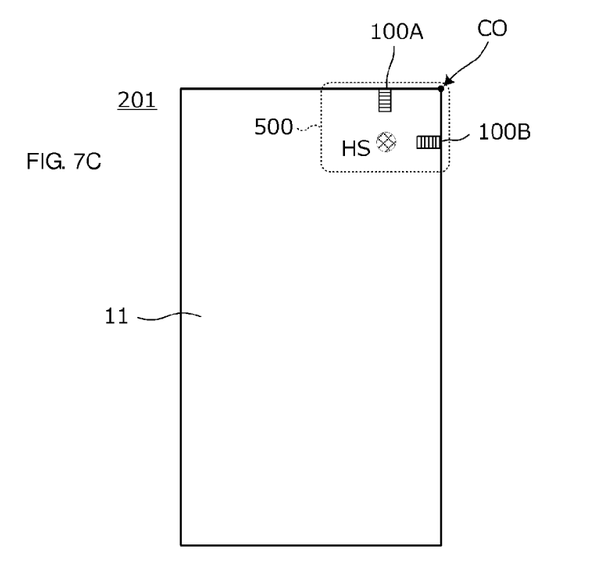

FIGS. 7A, 7B and 7C illustrate an effect caused by the winding axes of the two coil antennas 100A and 100B crossing each other. FIGS. 7A, 7B and 7C are plan views illustrating the positional relationship between the antenna device 201 according to this preferred embodiment and a communication partner RF tag 500. Here, the exterior shape of the RF tag 500 is indicated by a broken line. The shape of a coil antenna inside the RF tag 500 preferably is a loop shape extending along the broken line. FIG. 7A illustrates the positional relationship in a case where the RF tag 500 is shifted in the X axis direction with respect to the antenna device 201. In the antenna device 201, the coil antenna 100A whose winding axis is parallel or substantially parallel to the Y axis direction is arranged along the first edge ES1 that extends in the X axis direction and therefore the range over which communication is able to be performed has a margin in the X axis direction when RF tag 500 is brought close to the arrangement position of the coil antenna 100A of the antenna device 201. That is, communication is able to be performed even if the antenna device 201 is shifted along the X axis direction in the range illustrated in FIG. 7A. In addition, FIG. 7B illustrates the positional relationship in a case where the RF tag 500 is shifted in the Y axis direction with respect to the antenna device 201. In the antenna device 201, the coil antenna 100B whose winding axis is parallel or substantially parallel to the X axis direction is arranged along the second edge ES2 that extends in the Y axis direction and therefore the range over which communication is able to be performed has a margin in the Y axis direction when RF tag 500 is brought close to the arrangement position of the coil antenna 100B of the antenna device 201. That is, communication is able to be performed even if the antenna device 201 is shifted along the Y axis direction in the range illustrated in FIG. 7B.

Thus, as a result of winding axes of the two coil antennas 100A and 100B crossing each other, that is, as a result of a plurality of coil antennas having different winding axes being provided, the readable range in the X-Y plane is broadened.

FIG. 7C illustrates the positional relationship between a hot spot HS of the antenna device 201 and the RF tag 500. Since the coil antennas 100A and 100B are located in the vicinity of the corner CO of the planar conductor 11, the hot spot HS of the antenna device 201 (region in which coupling between RF tag 500 and coil antennas 100A and 100B is strongest) is located in the vicinity of that corner CO of the planar conductor 11. Here, a case is considered in which outer dimensions of the planar conductor 11 are larger than the outer dimensions of the coil antenna of the RF tag 500. If the RF tag 500 is held at a position so as to cover the hot spot HS in order to perform communication with certainty, the portion of the coil antenna of the RF tag 500 that faces the planar conductor 11 when viewed in plan from a direction perpendicular or substantially perpendicular to a main surface of the planar conductor 11 is comparatively small. As a result, unwanted coupling between the coil antenna of the RF tag 500 and the planar conductor 11 is small and fluctuations in the inductance of and fluctuations in the resonant frequency of an antenna portion of the RF tag 500 due to such unwanted coupling are significantly reduced or prevented.

Figure 8:
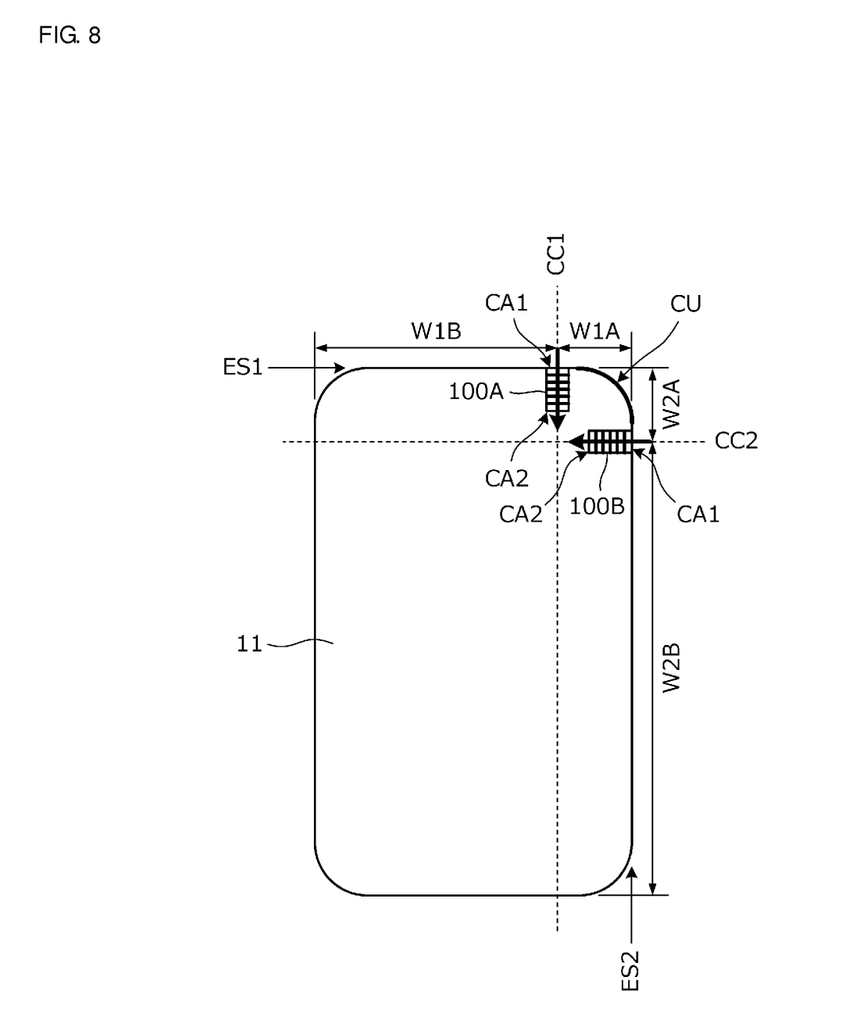
FIG. 8 is a plan view of another antenna device according to the first preferred embodiment of the present invention.

In the example described above, an example in which a rectangular or substantially rectangular planar conductor 11 is provided is described, but as illustrated in FIG. 8, for example, various preferred embodiments of the present invention are similarly applicable to an antenna device equipped with a planar conductor 11 including a first edge ES1 and a second edge ES2 between which a curved portion CU is interposed.

It is preferable that the coil winding axes CC1 and CC2 be parallel or substantially parallel to the planar conductor 11. This is because, if the winding axes were perpendicular or substantially perpendicular to the planar conductor 11, the majority of magnetic flux generated by the coil antennas (100A, 100B and so forth) would be neutralized by an induction current flowing in the planar conductor 11 and the amount of magnetic flux generated by the antenna device would be reduced. The term "parallel or substantially parallel" means within ±45°.

In addition, it is preferable that the coil winding axes CC1 and CC2 be perpendicular or substantially perpendicular to the edges ES1 and ES2 of the planar conductor 11. As a result of the edges (edge end portions) of the planar conductor 11 being perpendicular or substantially perpendicular to the winding axes, the coil antennas strongly couple with the edge end portions of the planar conductor 11 and therefore the capability of the planar conductor 11 to function as a booster of the antenna device is improved. The term "perpendicular or substantially perpendicular" means within ±45°. A coil winding axis has an optimal orientation depending on the arrangement location in a sense that "the coil antenna collects magnetic flux that does not contribute to communication" and does not need to be fixed.

Second Preferred Embodiment

Figure 9:
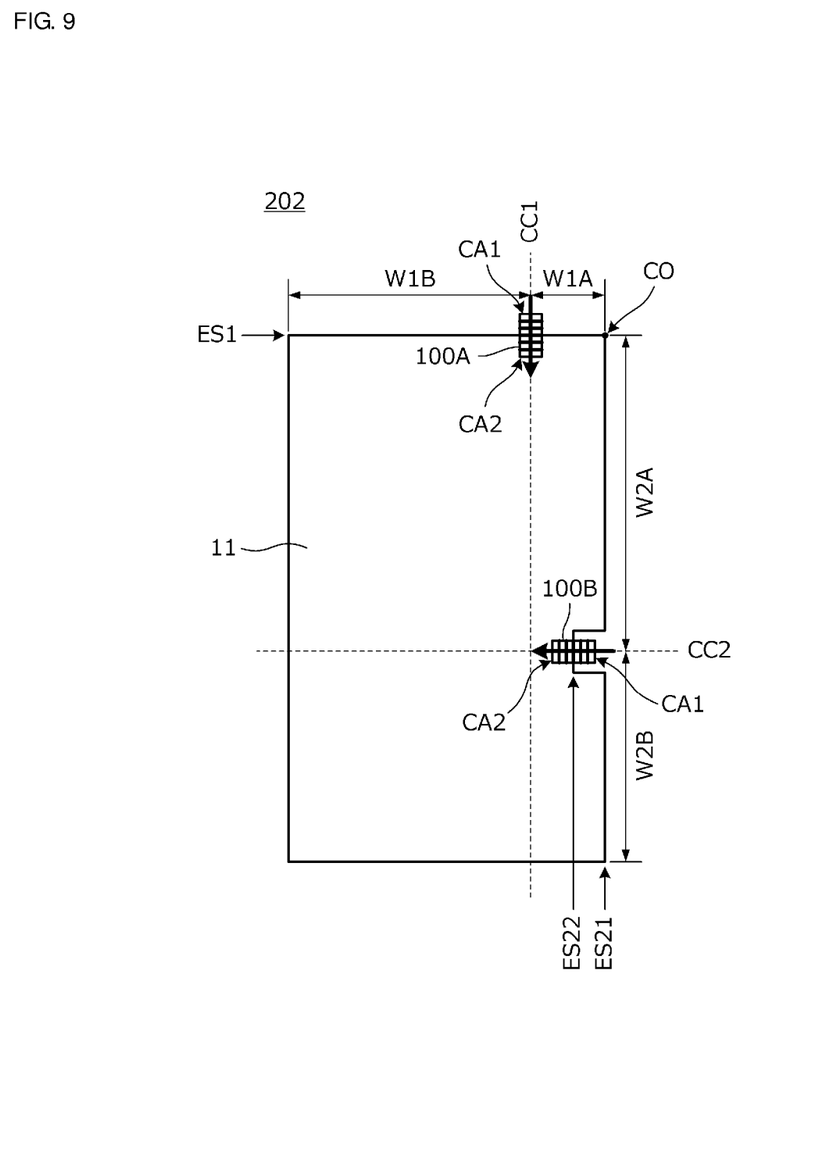
FIG. 9 is a plan view of an antenna device 202 according to a second preferred embodiment of the present invention.

FIG. 9 is a plan view of an antenna device 202 according to a second preferred embodiment of the present invention. The antenna device 202, as illustrated in FIG. 9, includes a first coil antenna 100A, a second coil antenna 100B and a planar conductor 11. The antenna device 202 differs from the antenna device 201 of the first preferred embodiment illustrated in FIG. 1 in the following ways.

(1) The relation W2A>W2B holds true for the second coil antenna 100B.

(2) A first coil opening end CA1 of the first coil antenna 100A is outside the planar conductor 11 when viewed in plan.

(3) A first coil opening end CA1 of the second coil antenna 100B is located farther toward to inside than a second edge ES21 of the planar conductor 11 and farther toward the outside than a partial second edge ES22 of the planar conductor 11.

The rest of the configuration preferably is the same or substantially the same as that of the antenna device 201 described in the first preferred embodiment.

Thus, it is sufficient that at least one coil antenna (first coil antenna 100A) among a plurality of coil antennas be arranged at a position that is along one edge (first edge ES1) of the planar conductor 11 and close to a corner CO (W1A<W1B).

With this arrangement, among magnetic flux generated by the first coil antenna 100A, the density of magnetic flux that does not contribute to communication is high on a portion of the planar conductor 11 close to the corner CO (region indicated by dimension W1A in FIG. 9). Consequently, magnetic flux generated by the two coil antennas 100A and 100B that does not contribute to communication is significantly reduced and the coupling coefficient with the communication-partner-side antenna device is increased by just making the second coil antenna 100B be close to another edge ES21 that sandwiches the corner CO between itself and the first edge ES1.

Furthermore, the coil antenna 100B is positioned inside from the edge ES21 of the planar conductor 11, but the first coil opening end CA1 of the coil antenna 100B protrudes beyond the edge ES22. As a result, a magnetism collection effect is increased and a high coupling coefficient is obtained over a wide angle.

The first coil antenna 100A may be arranged in the same way as the second coil antenna 100B. That is, the first edge ES1 may have a shape of a bay similarly to the second edges ES21 and ES22 and the first coil opening end CA1 of the first coil antenna 100A may be arranged farther toward the inside than a first edge ES1 of the planar conductor 11 and farther toward the outside than a partial second edge ES1.

Third Preferred Embodiment

Figure 10:
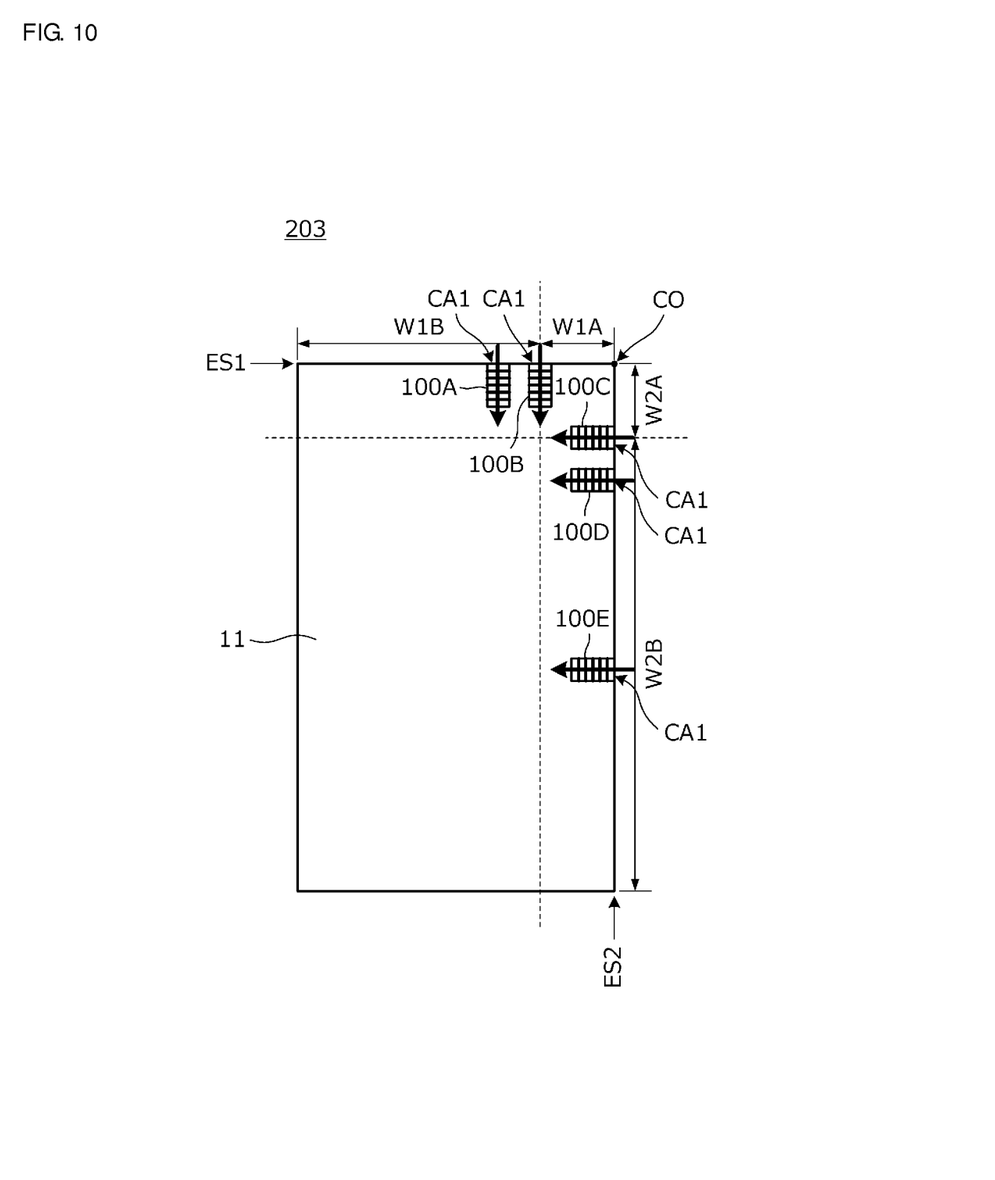
FIG. 10 is a plan view of an antenna device 203 according to a third preferred embodiment of the present invention.

FIG. 10 is a plan view of an antenna device 203 according to a third preferred embodiment of the present invention. The antenna device 203 of this preferred embodiment preferably includes five coil antennas 100A, 100B, 100C, 100D and 100E. The coil antennas 100A and 100B are arranged such that first opening ends CA1 thereof are contiguous with a first edge ES1 of a planar conductor 11 and the coil antennas 100C, 100D and 100E are arranged such that first opening ends CA1 thereof are contiguous with a second edge ES2 of the planar conductor 11.

Three or more coil antennas may be arranged in this way. In this case, it is sufficient that at least one coil antenna be arranged close to a corner CO. In this case as well, the coupling coefficient with a communication-partner-side antenna device is increased by adopting the configuration described in the first preferred embodiment for the coil antennas 100B and 100C, which are closest to the corner CO. Furthermore, if the number of coil antennas is a plurality of three or more, more magnetic flux is coupled with the communication-partner-side antenna device directly or via the planar conductor 11 and therefore the antenna characteristics are further improved.

Fourth Preferred Embodiment

Figure 11A:
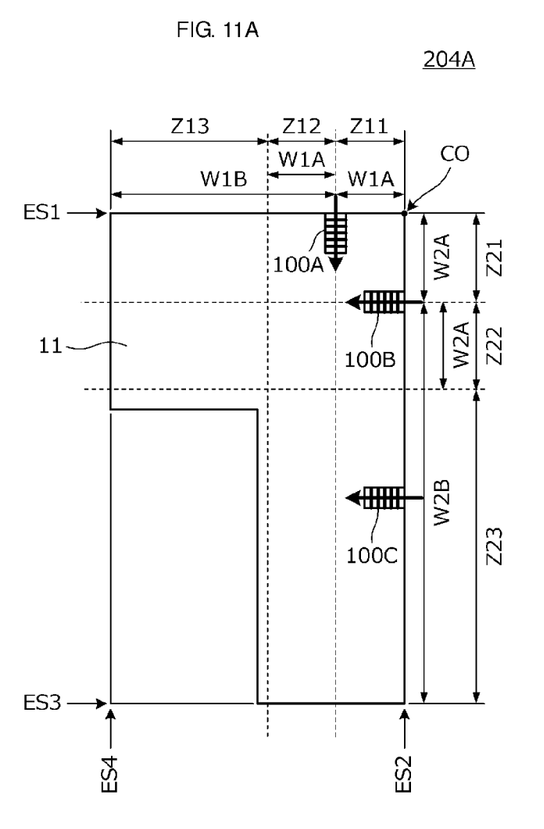
FIGS. 11A and 11B are plan views of antenna devices 204A and 204B according to a fourth preferred embodiment of the present invention.
Figure 11B:
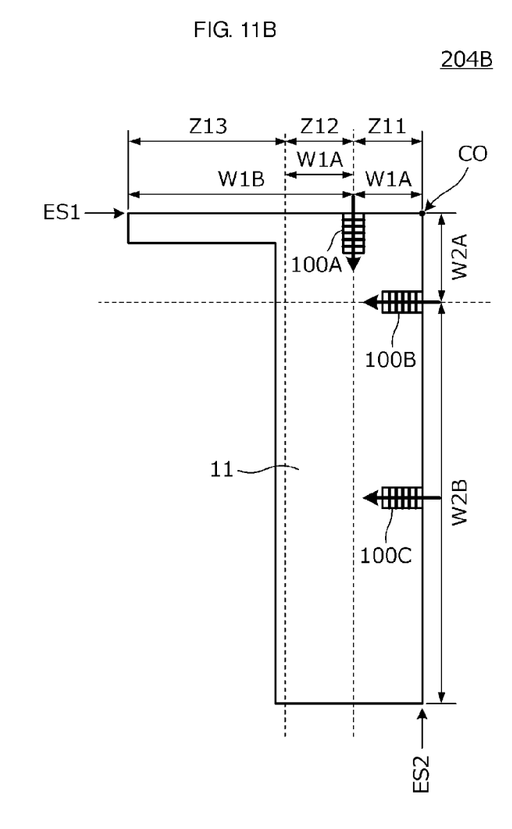

In this preferred embodiment, examples of an antenna device that is equipped with a non-rectangular planar conductor 11 are described. FIGS. 11A and 11B are plan views of antenna devices 204A and 204B according to the fourth preferred embodiment. In these examples, the planar conductor is narrow in a region that is close to the coil antennas 100A and 100B and that faces (is on the opposite side to) the corner CO of the planar conductor 11.

Here, when W1A represents a distance from the corner CO to the coil antenna 100A close to the corner CO, regions Z11 and Z12 are regions that are ±W1A either side of the coil antenna 100A and Z13 represents a region from the region Z12 to an edge ES4 of the planar conductor 11, the density of magnetic flux that does not contribute to communication is high in the region Z11 compared with the region Z13. An effect in which magnetic flux that is generated by a coil antenna (first coil antenna 100A) on one edge (first edge ES1) and that does not contribute to communication is canceled out by magnetic flux generated by a coil antenna (second coil antenna 100B) on another edge (second edge ES2) depends on the existence of the planar conductor in the region Z11. Consequently, the planar conductor 11 need not exist in the region Z13.

Similarly, when W2A represents a distance from the corner CO to the coil antenna 100B close to the corner CO, regions Z21 and Z22 are regions that are ±W2A either side of the coil antenna 100B and Z23 represents a region from the region Z22 to an edge ES3 of the planar conductor 11, the density of magnetic flux that does not contribute to communication is high in the region Z21 compared with the region Z23. An effect in which the density of magnetic flux that is generated by a coil antenna (second coil antenna 100B) on one edge (second edge ES2) and that does not contribute to communication is high in a region on the corner CO side and this magnetic flux is canceled out by magnetic flux generated by a coil antenna (first coil antenna 100A) on another edge (first edge ES1) depends on the existence of the planar conductor in the region Z21. Consequently, the planar conductor 11 need not exist in the region Z23.

Either of the configuration in which the planar conductor 11 need not exist in the region Z13 or the configuration in which the planar conductor 11 need not exist in the region Z23 described above may be adopted. In the example illustrated in FIG. 11B, the planar conductor 11 does not exist in the region Z13. In this case as well, a coupling coefficient improvement effect is obtained due to magnetic flux that does not contribute to communication with the communication-partner-side antenna device being canceled out.

Fifth Preferred Embodiment

Figure 12A:
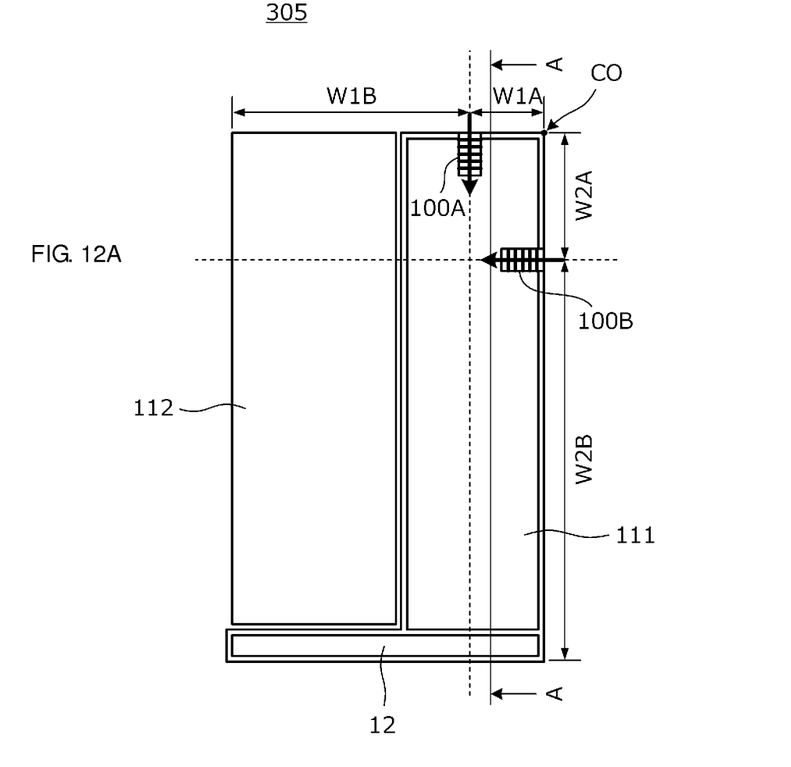
FIG. 12A is a plan view of the inside of an electronic appliance 305 including an antenna device according to a fifth preferred embodiment of the present invention and FIG. 12B is a sectional view of a portion along A-A in FIG. 12A.
Figure 12B:
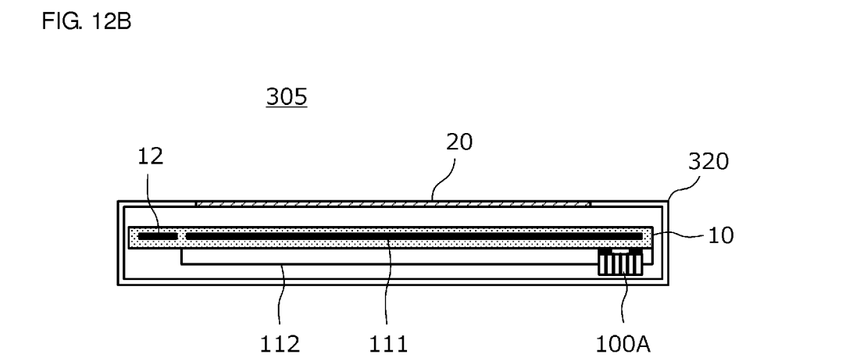

In a fifth preferred embodiment of the present invention, description is given of a mobile terminal device as a non-limiting example of an electronic appliance. FIG. 12A is a plan view of the inside of a mobile terminal device 305 according to the fifth preferred embodiment and FIG. 12B is a sectional view of a portion along A-A in FIG. 12A. Here, illustration of electronic components such as active components and passive components on a circuit board and devices such as a display is omitted.

In the mobile terminal device 305, a display panel 20 is provided in a terminal casing 320. A substrate 10, a battery pack 112 and so forth are built into the inside of the terminal casing 320. The substrate 10 preferably is a multilayer substrate, for example. A radiating element 12, which acts as a cellular phone main antenna (UHF band antenna) is provided in the substrate 10. In addition, a ground conductor 111 is provided in the substrate 10. The radiating element 12 and the ground conductor 111 each act as a portion of a planar conductor. In addition, the battery pack 112 also acts as a portion of the planar conductor. That is, an antenna device preferably includes, for example, the substrate 10, the coil antennas 100A and 100B, and the battery pack 112. The substrate 10 is provided with a communication circuit and the communication circuit is connected to the coil antennas 100A and 100B.

Edges of the planar conductor defined by the ground conductor 111 and the battery pack 112 are cut by a space between the ground conductor 111 and the battery pack 112, but since magnetic flux defines a magnetic path that avoids metal because of an induction current, the ground conductor 111 and the battery pack 112 act as an integrated planar conductor so long as the space is narrow.

In the description of preferred embodiments of the present invention, planar conductor refers to a conductor that that at least partially has a planar shape. Therefore, this term includes a ground conductor of a circuit board inside an electronic appliance, the surface of a battery pack, a shield plate and so forth. In addition, even if there is a difference in level as illustrated in FIG. 12B, magnetic flux generates a magnetic path along the planar conductor.

The antenna device may include a plurality of planar conductors as in this preferred embodiment.

Various preferred embodiments of the present invention can be similarly applied to all electronic appliances in which the antenna device of various preferred embodiments of the present invention is installed such as communication terminal devices such as so-called smart phones and cellular phone terminals, tablet PCs and notebook PCs, wearable terminals such as so-called smart glass and smart watches, games consoles, cameras, and RFID tags such as cards.

In each of the preferred embodiments of the present invention, other than connecting the coil antennas in series with each other or connecting the coil antennas in parallel with each other, the method of connecting a plurality of coil antennas with each other may be connecting circuits including serially connected coil antennas in parallel with each other, connecting circuits of parallel connected coil antennas in series with each other, or a combination of these methods.

In addition, in the above-described preferred embodiments, a non-limiting example is described in which a first coil antenna (coil antenna 100A, for example) and a second coil antenna (coil antenna 100B, for example) are preferably arranged on the same surface and consequently a winding axis of the first coil antenna and a winding axis of the second coil antenna cross each other, but the present invention is not limited to this structure. By arranging a first coil antenna (coil antenna 100A, for example) and a second coil antenna (coil antenna 100B, for example) on different surfaces (in a state where there is a difference in level), the winding axis of the first coil antenna and the winding axis of the second coil antenna may be given a twisted positional relationship. Furthermore, the angle at which the winding axis of the first coil antenna and the winding axis of the second coil antenna cross when viewed in plan is not limited to 90°.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a plurality of coil antennas each including a coil conductor wound around a winding axis; and
a planar conductor including a first edge and a second edge between which a corner or a curved portion is interposed; wherein
a first coil antenna among the plurality of coil antennas is arranged at a position along the first edge of the planar conductor at which one coil opening end thereof is superposed with the planar conductor when viewed in plan and that is close to the corner or close to the curved portion;
a second coil antenna among the plurality of coil antennas is arranged at a position along the second edge of the planar conductor at which one coil opening end thereof is superposed with the planar conductor when viewed in plan;
another coil opening end of the first coil antenna is outside of the planar conductor or is on the first edge of the planar conductor when viewed in plan;
the first coil antenna and the second coil antenna are connected in parallel or in series with each other such that magnetic flux generated by the first coil antenna and magnetic flux generated by the second coil antenna are in phase with each other in an outward direction with the first edge and the second edge of the planar conductor defining boundaries; and
the first coil antenna and the second coil antenna are connected to a same feeder circuit.

2. The antenna device according to claim 1, wherein the second coil antenna is arranged at a position close to the corner or close to the curved portion.

3. The antenna device according to claim 1, wherein the winding axis of the first coil antenna and the winding axis of the second coil antenna cross each other or have a twisted positional relationship.

4. The antenna device according to claim 1, wherein the planar conductor has a rectangular or substantially rectangular shape.

5. The antenna device according to claim 1, wherein the first coil antenna is located closer to the corner than a center of the first edge.

6. The antenna device according to claim 1, wherein the second coil antenna is located closer to the corner than a center of the second edge.

7. The antenna device according to claim 1, wherein W1A<W1B, where W1A and W1B represent distances from two ends of the first edge to the first coil antenna.

8. The antenna device according to claim 1, wherein W2A<W2B, where W2A and W2B represent distances from two ends of the second edge to the second coil antenna.

9. The antenna device according to claim 1, wherein at least one of the first and second coil antennas includes a multilayer body including non-magnetic layers and magnetic layers.

10. The antenna device according to claim 9, wherein the multilayer body includes line-shaped electrodes and via-hole electrodes.

11. The antenna device according to claim 1, wherein the feeder circuit includes a reactance element configured to provide impedance matching and resonant frequency setting of the first and second coil antennas.

12. The antenna device according to claim 1, wherein the winding axes of the first and second coil antennas are parallel or substantially parallel to the planar conductor.

13. The antenna device according to claim 1, wherein the winding axes of the first and second coil antennas are perpendicular or substantially perpendicular to the first and second edges of the planar conductor.

14. An electronic appliance comprising:
the antenna device according to claim 1; and
a communication circuit connected to the plurality of coil antennas.

15. The electronic appliance according to claim 14, wherein the electronic appliance is a mobile terminal device.

16. The electronic appliance according to claim 14, wherein the electronic appliance is one of a phone, a computer, a wearable terminal, a game console, a camera, and an RFID device.

17. The antenna device according to claim 1, wherein another coil opening end of the second coil antenna is outside of the planar conductor or is on the second edge of the planar conductor when viewed in plan.

* * * * *